Figure 1:
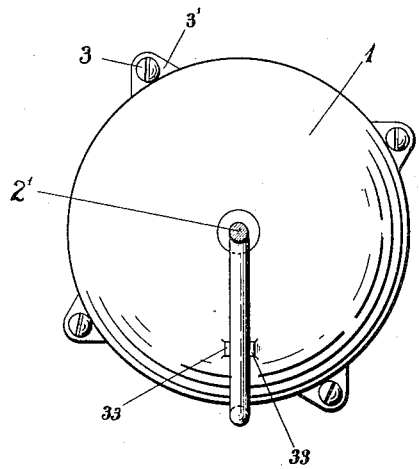

July 25, 1933.    S. S. GREEN    1,920,032
CIRCUIT CONTROLLER
Filed June 23, 1930    2 Sheets-Sheet 1

Stanley S. Green.
INVENTOR

BY G. L. Cragg
ATTORNEY

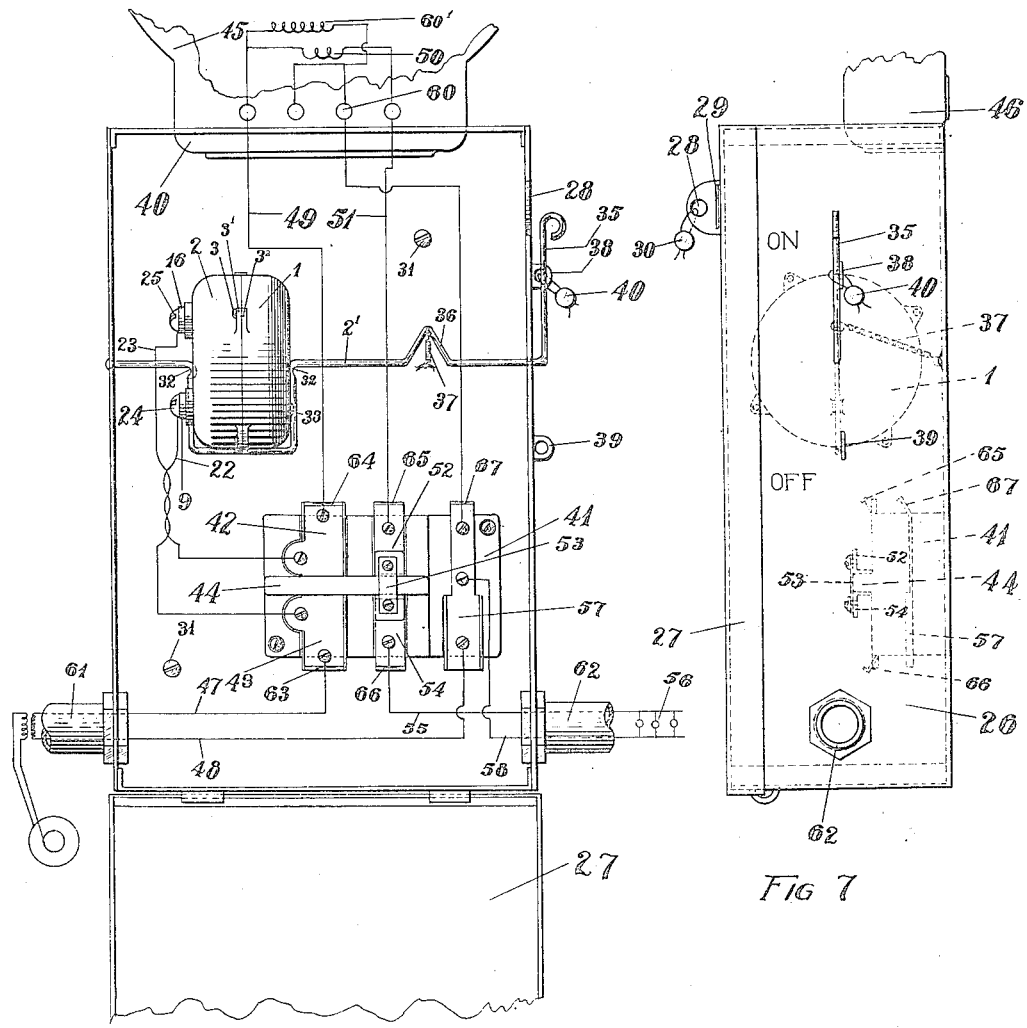

Patented July 25, 1933

1,920,032

UNITED STATES PATENT OFFICE

STANLEY S. GREEN, OF LA FAYETTE, INDIANA, ASSIGNOR TO DUNCAN ELECTRIC MANUFACTURING COMPANY, OF LA FAYETTE, INDIANA, A CORPORATION OF ILLINOIS

CIRCUIT CONTROLLER

Application filed June 23, 1930. Serial No. 463,174.

My invention relates to controllers for electric circuits and is of particular utility in connection with structures forming the subject matter of my copending application Serial No. 285,114, filed June 13, 1928, though my invention is not to be limited to this use. In my said copending application, I have disclosed an electric circuit controller which is inclusive of a body of electric current conducting material, such as mercury, that is normally contained in the bore or passage of a conduit made of insulating material. This current conducting liquid serves to electrically connect two electrodes of the associated circuits, when the device is in circuit closing position. When there is an abnormal flow of current through the device, the liquid conductor, or a sufficient portion of it, is expelled to break the electrical connection between the electrodes and thereby open the circuit and guard the translating device within the circuit. The liquid conductor and associated electrodes and parts thus constitute a circuit protecting switch which may, if desired, be manually operated to open and close the circuit. My present invention has for its general object the provision of a mounting and housing for such a liquid actuated switch whereby it may be conveniently connected in circuit. It has as a further object the provision of such housing for the connections to the switch that they are relatively enclosed and non-tamperable, the switch, at the same time, being operable manually to open or close the circuit from the exterior of the housing. A further object is the employment of such a liquid conductor switch to take the place of the common type of fuse and knife-blade switch in series with said fuse ordinarily used in apparatus of this class.

I also provide an actuating or movable support with which the switch is separably assembled in predetermined relation. This feature of my invention is of importance in new installations and may be employed to provide for accurate replacement of switches with those of larger or smaller capacity. It also enables the ready and accurate substitution of perfectly functioning switches for those that may have become impaired.

In carrying out my invention in the preferred way, I employ a circuit controller actuated by liquid conductor that has a switching action as well as a function of automatically opening the circuit upon overloads, and I mount such circuit controller so that it is movable within a suitable box, preferably made of metal. Within such box, the circuit leads desirably terminate and are fastened and also within such box I preferably provide flexible leads which connect the liquid conductor or circuit controller to the circuit terminals to permit the circuit controller to be movable.

Figure 2:
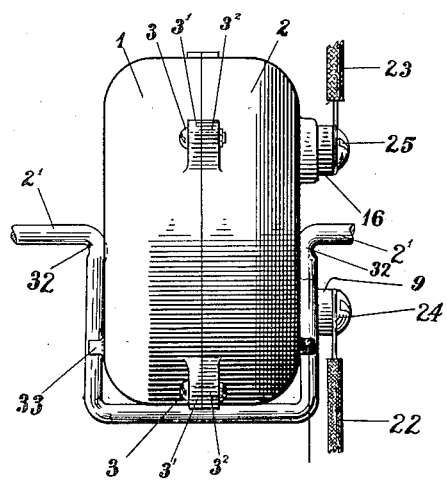
Figure 3:
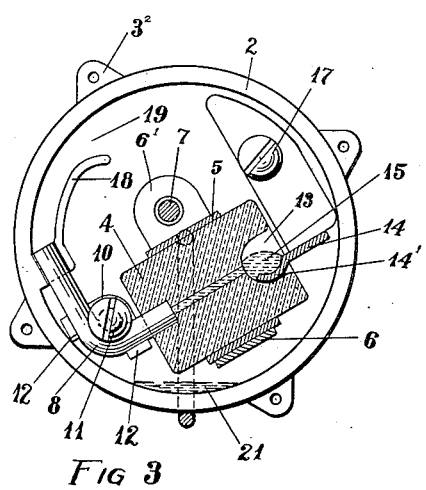
Figure 4:
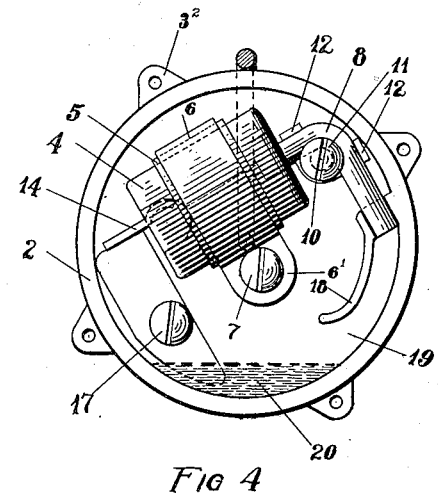
Figure 5:
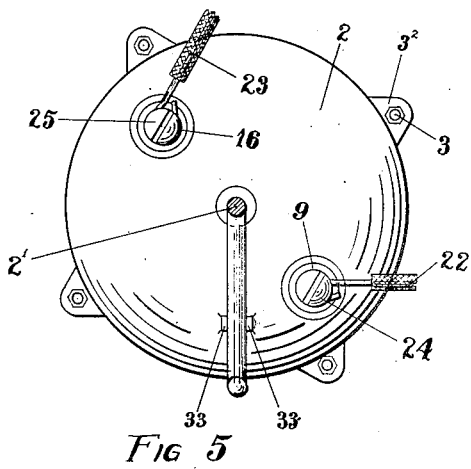

The invention will be more fully explained in connection with the accompanying drawings showing the preferred embodiment thereof and in which Fig. 1 is a side elevation of a circuit controller in "on" or circuit closing position; Fig. 2 is a rear elevation of the controller shown in Fig. 1; Fig. 3 is an interior view of the controller, positioned as shown in Figs. 1 and 2, that is afforded when one of the casing halves is removed, some parts being shown in section; Fig. 4 is a view similar to Fig. 3 but with the controller in the "off" or circuit opening position, interior parts that are shown in section in Fig. 3 being shown in elevation; Fig. 5 is an elevation of the other side of the controller positioned as in Figs. 1, 2 and 3, the "on" position; Fig. 6 is a front view of the complete assembly with the lid of the enclosing box opened, circuit connections being also diagrammatically illustrated; and Fig. 7 is a side elevation of the equipment shown in Fig. 6 with the box lid closed and sealed and some interior parts shown by dotted lines.

In the forms of the invention illustrated, the casing is formed of insulating material, such as moulded bakelite or a similar moulded material having a phenolic resin base, excepting for the bolts, screws and the anchorages that are united therewith. This casing is inclusive of the right half or removable cup shaped section or shell 1 and the left half or cup shaped section or shell 2. These casing sections are clamped snugly together, as by means of the metallic bolts 3 which pass through external ears 3' and are screwed into ears 3² respectively formed on the casing sections. The pressure exerted by said bolts is sufficient to bring the engaging flat faces of the casing sections into intimate contact so that the casing is imperforate in this region and throughout the entire circumference of the casing which is desirably cylindrical. The mating surfaces brought together by bolts 3 should be flat and may be ground so if desired before being put together. A film of cement, such as bakelite varnish, is desirably applied to these flat surfaces before placing them together and tightening bolts 3. The circuit controlling element is within the casing and is operable to "on" and "off" positions by suitably moving the casing which is desirably rotatively mounted upon a shaft 2', later to be described. This circuit controlling element includes, as shown in the embodiment of the invention illustrated, a conduit or receptacle 4 of refractory heat resisting insulating material, preferably porcelain produced by the wet process. This conduit or receptacle is desirably surrounded by a reenforcing metal collar or jacket 5 that is preferably of iron and is desirably initially of smaller internal diameter or size than the portion of the conduit it surrounds and requires expansion by heat in order that it may be tightly secured in place about conduit 4, the jacket being allowed to cool and contract tightly upon the conduit to provide the reenforcement desired. A circular clamp 6 having ears 6' is placed over both tube 4 and jacket 5. Said ears 6' are securely fastened by a screw 7 passed therethrough and into suitable assembly with shell 1.

The bore of conduit 4 communicates with the bore of an L shaped metallic feed tube 8, preferably of iron, which fits snugly into an enlargement of the lower end of the conduit bore. When in the normal circuit closing position of the controller, as shown in Figs. 1, 2, 3, 5, 6 and 7, feed tube 8 constitutes the lower electrode of the device. Current enters this electrode from a lower metallic lead-in stud 9 about which the casing section 2 is so moulded that this stud is fixed with respect to and extends through the casing. A metal clamp 10 is securely and fixedly mounted on the inner end of stud 9 by a screw 11 which passes through clamp 10 and into this stud. This clamp has ears 12 which respectively engage the legs of the L shaped feed tube 8. The stem of metallic screw 11 is positioned against the inner side of the bight of feed tube 8 to hold the tube against the clamp ears 12 and the head of this screw holds the feed tube against the body of clamp 10. This arrangement affords adequate electrical contact between the metallic stud 9 and the metallic feed tube or electrode 8.

The upper end of the bore of the conduit 4 is enlarged to form a well 13 adapted to receive the spoon shaped end 14' of the upper metallic electrode 14, which conforms to the well 13 and contacts with the mercury 15 or other liquid conductor contained in the conduit bore and the well enlargement 13 when the device is in circuit closing position. Slight clearance desirably intervenes between the wall of well 13 and the electrode part 14'. Upper electrode 14 is positioned independently of conduit 4, being fastened in position upon a metallic lead-in stud 16 by a screw 17 threading into the inner end of this stud.

Mating projections (of which one 18 is shown on shell 1) are respectively integrally moulded with the casing shells 1 and 2, and form, with contiguous portions of the casing, a funnel shaped space 19. The receiving end of the tubular electrode or feed tube 8 may be freely received within the stem of the funnel to virtually constitute a continuation thereof. Said funnel and the conduit 4 are so positioned with respect to the casing that, when the device is turned from "on" to "off" position, the mercury will be discharged from the conduits 4 and 8 and the well 13 into the surrounding space and to an extent to open the circuit at 14', the liquid conductor then falling to the then bottom of the casing as indicated at 20 in Fig. 4. When the device is turned from "off" to "on" position, the cup of funnel 19 will gather most of the liquid conductor at 20, this gathered liquid passing by gravity through the cup and stem of the funnel and into the feeding tube or hollow electrode 8 and the bore of conduit 4 and well continuation 13 of the conduit bore whereby the circuit is closed at the electrode tip 14'. To insure closure of the circuit, I provide an excess of mercury or liquid conductor which finds lodgment in the then bottom of the casing as indicated at 21 in Fig. 3, this excess flowing from the well when the device has been fully brought to its "on" or circuit closing position.

Current of the circuit to be controlled is supplied to the device through leads 22 and 23 which are preferably flexible to permit proper motion of the device and which are fastened to the respective lead-in studs 9 and 16 by means of binding screws 24 and 25.

When the device is in the "on" position, and the controlled circuit is closed at a lamp or other translating device, the circuit is inclusive of the flexible lead 22, lower lead-in stud 9, metal feed tube clamp 10, metal feed tube and hollow electrode 8, the liquid conductor 15 in the bore of the conduit 4 and well 13, the upper electrode 14, the upper lead-in stud 16 and the flexible lead 23.

The specific structure thus far described forms the subject matter of my copending application Serial No. 455,679 filed May 26, 1930, features also being disclosed in my copending application Serial No. 446,566, filed April 23, 1930. It is to be understood however that the invention is not to be limited to the specific form of switch herein shown.

A box-like cabinet 26, preferably formed of sheet metal, contains the structure above specifically described. It is provided with a cover 27 which may be conveniently hinged to the bottom of the body of the cabinet. It is shown in Fig. 6 as having been opened downwardly to afford access to the box. With the cover in place, the cabinet may be completely closed and made inaccessible. To this end an eye 28 and corresponding slot 29 to fit such eye may be respectively provided on the box and its cover. A sealing wire 30 is passed through the opening in eye 28 to prevent the cover from being undetectably opened.

The box is normally mounted on a wall or other support by means of screws 31.

The shaft 2' passes through the box and is journaled in its upright sides. This shaft has a part bent to form a stirrup that snugly receives and holds controller casing 1, 2. The heels of this stirrup 32 seat themselves firmly by spring action into slight recesses in the two flat faces of the controller casing from which faces small lugs 33 project to further engage said stirrup and firmly hold it in fixed relation to the casing. The circuit controller casing is thus simply and separably held in assembly with said shaft. Said shaft is extended through the right hand side of the box and is there bent at approximately right angles to form an operating handle 35, which may be moved from one position to another without removing the cover of the box or opening such cover. As illustrated in Figs. 6 and 7, said handle is in its uppermost position, the liquid conductor circuit controller or switch then being in its circuit closing or normal "on" position. By moving said handle approximately a half turn to its lowermost position the switch is placed in an "off" or circuit opening position. When the handle is in its uppermost or "on" position and the circuit is automatically opened by the controller, the handle is obviously still in an "on" or circuit closing position although the current has been interrupted. The circuit may be reclosed by moving the handle to its lowermost or "off" position and then returning it to its normal "on" or uppermost position. The words "on" and "off" may be placed on the box adjacent the operating handle in its respective "on" and "off" positions. The shaft 2' is slightly bent within the box as indicated at 36. A coiled retractile spring 37 connects the bend or offset 36 with the rear wall of the box to hold the operating shaft 2' in either the full "on" or the full "off" position. Stops 38 and 39 are provided on the outside of the box and respectively take part in holding shaft 2' and handle 35 in "on" and "off" positions. A suitable seal 50 may be employed to prevent the handle and shaft from being undetectably removed from the positions they are to occupy.

A small stationary terminal or connection block 41 of insulating material, such as porcelain, and shaped suitably to the use to which the equipment is to be put, is mounted within and upon the back wall of the box. Two metallic terminal plates 42 and 43 are mounted upon said block and to which the flexible leads 22 and 23 are respectively connected. An insulating barrier or rib 44 desirably forms an integral part of said block and effectively spaces the terminals apart.

I have illustrated a portion 45 of an ordinary induction watthour meter for measuring the energy in the consumption circuit that also contains the equipment of my invention. This meter may be provided at the top of the box which has a rectangular hole in its top wall through which the terminal chamber or other portion 46 of the meter may snugly pass. In the circuit illustrated in Fig. 6, the supply wires 47, 48 of a single phase two-wire electric circuit are shown coming into the box at the left. Wire 47 is connected to terminal 43 which is connected by lead 49 to one terminal of the meter current coil 50. The other terminal of this current winding is connected by lead 51 with a terminal strip 52 on the aforesaid connection block 41, this strip 52 being connected by a removable testing link 53 with another terminal 54 also on said connection block. One load side wire 55 connects the terminal 54 with the translating devices 56 in the load circuit. The other or solid neutral side 49 of the circuit passes into the box through its left wall and is secured to neutral terminal strap 57 also on the connection block 41. This terminal strap is conveniently placed closer to the back wall mounting of box 26 than the other terminals on this block to better space this terminal from the other terminals. Wire 58 connects terminal 57 with the other side of the consumption circuit. Wire lead 59 provides a potential connection to one of the middle meter terminals 60 of the watthour meter and thus cause the potential circuit 60' of the meter to be energized. Conduits or nipples 61, 62 may be assembled with the box for the passage of the wiring 47, 48, 55, and 58.

The equipment of my invention not only provides control and switching for the circuit but also provides commercial facilities for conveniently testing the meter, the various terminals upon the block having test ears 63, 64, 65, 66 and 67. Removable or disconnecting link 53 is also serviceable in testing. If this link is removed one end of the meter current coil 50 is disconnected. Such link may be removed safely without disconnecting the consumer's load which may continue to be supplied around the meter by first connecting such terminals as 42 and 54 by a suitable connecting wire or jumper not shown. In this way the meter may be prepared for testing. It is evident, however, that my invention may be used in connection with a metal box which does not have a watthour meter assembled with it.

With my equipment, the predetermined or rated current-carrying capacity of a given device cannot be changed without actually changing from one liquid conductor switch to another of the desired different rating. This may readily be done by the tester since the liquid conductor switch is removable from the stirrup in shafts 2' and the flexible leads may be loosened from the terminal block, a rearrangement that unauthorized persons cannot readily make, although any one may readily reclose the circuit, after an automatic interruption upon overload, by means of handle 35. Temptation or excuse for unauthorized tampering with the interior of the box are thus removed, since access to the box is only required for complete renewal or change of the liquid switch, extensive repairs or testing. In my arrangement the liquid conductor circuit controller takes the place of a knife-blade switch and its mountings within the box together with a plug or cartridge type fuse and its mountings. The elimination of these items and the combination of their functions in the one unitary liquid conductor controller enables the use of the simple form of connection block in the box and makes for space economy. The liquid conductor circuit controller is sealed and all circuit making or breaking together with attendant arcing, even upon automatic interruption of the circuit, occurs within the air tight casing 1, 2, which makes the use of the equipment safe on commercial circuits in hazardous locations exposed to inflammable gas or fumes, where overload protection as well as switching action is desired. The stirrup in the shaft and the engaging portions of the controller casing, which are similarly positioned in controllers of all capacities, cooperate to place the internal mechanism of any substituted controller in the same relation with the shaft that was occupied by the internal mechanism of the replaced controller. I do not wish to be limited to this means, however, for thus enabling quick and accurate replacements of the controllers. The handle upon the shaft also constitutes an index that indicates the adjustment that is effected by the switch. By providing suitable interengaging formations between the shaft and switch casing the handle will perform this function with any switch that is assembled with it.

Changes may be made without departing from the invention.

Having thus described my invention, I claim:

1. The combination with a liquid conductor switch; of a shaft upon and with which the switch turns and having an intermediate portion that is bent into a stirrup that receives the switch and holds it in fixed relation to the shaft.

2. The structure of claim 1 wherein the shaft and switch have separable interengaging formations to establish a predetermined relative position between the shaft and switch and wherein the shaft is provided with an index to indicate the circuit adjustment effected by the switch.

3. Circuit controlling apparatus including in combination a rotatably mounted shaft having formed therein a stirrup-like portion, a liquid conductor switch removably mounted on said shaft in said stirrup-like portion, said switch having lugs engaging displaced portions of the stirrup and securing the switch in fixed relation to said shaft.

4. Circuit controlling apparatus including in combination a rotatably mounted shaft having formed therein a stirrup-like portion, a liquid conductor switch removably mounted on said shaft in said stirrup-like portion, said switch having lugs engaging displaced portions of the stirrup and securing the switch in fixed relation to said shaft, said shaft having extended seat portions which extend into corresponding pockets in said switch to retain said switch in place.

STANLEY S. GREEN.